United States Patent
Bikel et al.

(10) Patent No.: US 9,324,323 B1
(45) Date of Patent: Apr. 26, 2016

(54) SPEECH RECOGNITION USING TOPIC-SPECIFIC LANGUAGE MODELS

(71) Applicant: Google Inc., Mountain View, CA (US)

(72) Inventors: Daniel M. Bikel, Mount Kisco, NY (US); Kapil R. Thadini, New York, NY (US); Fernando Pereira, Menlo Park, CA (US); Maria Shugrina, Brooklyn, NY (US); Fadi Biadsy, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 52 days.

(21) Appl. No.: 13/715,139

(22) Filed: Dec. 14, 2012

Related U.S. Application Data

(60) Provisional application No. 61/586,670, filed on Jan. 13, 2012.

(51) Int. Cl.
| | | |
|---|---|---|
| *G10L 15/26* | (2006.01) | |
| *G10L 15/183* | (2013.01) | |
| *G10L 15/197* | (2013.01) | |

(52) U.S. Cl.
CPC ............ *G10L 15/26* (2013.01); *G10L 15/197* (2013.01); *G10L 15/183* (2013.01)

(58) Field of Classification Search
CPC ............ G10L 2015/0631; G10L 15/18; G10L 15/1815; G10L 15/183; G10L 15/197
USPC ...................................... 704/9, 251, 255, 257
See application file for complete search history.

(56) References Cited

U.S. PATENT DOCUMENTS

| | | | |
|---|---|---|---|
| 4,571,697 A | | 2/1986 | Watanabe |
| 4,783,802 A | | 11/1988 | Takebayashi et al. |
| 4,860,358 A | | 8/1989 | Rabiner |
| 4,908,865 A | | 3/1990 | Doddington et al. |
| 5,131,043 A | | 7/1992 | Fujii et al. |
| 5,828,999 A | * | 10/1998 | Bellegarda et al. ........... 704/240 |
| 5,839,106 A | * | 11/1998 | Bellegarda .................... 704/257 |
| 5,864,810 A | | 1/1999 | Digalakis et al. |
| 5,946,653 A | | 8/1999 | Campbell et al. |
| 5,953,699 A | | 9/1999 | Takagi |
| 5,983,177 A | | 11/1999 | Wu et al. |
| 6,104,989 A | * | 8/2000 | Kanevsky et al. ................. 704/9 |
| 6,336,108 B1 | | 1/2002 | Thiesson et al. |
| 6,529,902 B1 | * | 3/2003 | Kanevsky et al. |
| 6,542,866 B1 | | 4/2003 | Jiang et al. |

(Continued)

OTHER PUBLICATIONS

Lane et al. "Dialogue speech recognition by combining hierarchical topic classification and language model switching." IEICE transactions on information and systems 88.3, Mar. 2005, pp. 446-454.*

(Continued)

*Primary Examiner* — James Wozniak
(74) *Attorney, Agent, or Firm* — Fish & Richardson P.C.

(57) ABSTRACT

Speech recognition techniques may include: receiving audio; identifying one or more topics associated with audio; identifying language models in a topic space that correspond to the one or more topics, where the language models are identified based on proximity of a representation of the audio to representations of other audio in the topic space; using the language models to generate recognition candidates for the audio, where the recognition candidates have scores associated therewith that are indicative of a likelihood of a recognition candidate matching the audio; and selecting a recognition candidate for the audio based on the scores.

19 Claims, 7 Drawing Sheets

(56) References Cited

U.S. PATENT DOCUMENTS

| | | | |
|---|---|---|---|
| 6,983,246 B2 | 1/2006 | Kepuska et al. | |
| 7,272,558 B1 | 9/2007 | Soucy et al. | |
| 7,310,601 B2 | 12/2007 | Nishizaki et al. | |
| 7,761,296 B1 | 7/2010 | Bakis et al. | |
| 7,983,902 B2* | 7/2011 | Wu et al. | 704/10 |
| 8,001,066 B2 | 8/2011 | Colbath et al. | |
| 8,301,450 B2* | 10/2012 | Lee et al. | 704/257 |
| 2002/0087309 A1* | 7/2002 | Lee et al. | 704/240 |
| 2003/0055640 A1 | 3/2003 | Burshtein et al. | |
| 2004/0088162 A1* | 5/2004 | He et al. | 704/235 |
| 2005/0119885 A1 | 6/2005 | Axelrod et al. | |
| 2005/0149326 A1* | 7/2005 | Hogengout et al. | 704/242 |
| 2005/0182628 A1* | 8/2005 | Choi | 704/252 |
| 2005/0203738 A1 | 9/2005 | Hwang | |
| 2006/0100876 A1* | 5/2006 | Nishizaki | G10L 15/32 704/257 |
| 2006/0129392 A1 | 6/2006 | Kim | |
| 2006/0149710 A1* | 7/2006 | Koningstein et al. | 707/3 |
| 2006/0184360 A1 | 8/2006 | Murveit et al. | |
| 2007/0037513 A1* | 2/2007 | Bellamy et al. | 455/3.04 |
| 2007/0100618 A1* | 5/2007 | Lee et al. | 704/238 |
| 2007/0106685 A1 | 5/2007 | Hough et al. | |
| 2007/0118372 A1 | 5/2007 | Wise et al. | |
| 2007/0265849 A1 | 11/2007 | Grost et al. | |
| 2008/0195389 A1 | 8/2008 | Zhang et al. | |
| 2008/0201143 A1* | 8/2008 | Olligschlaeger et al. | 704/235 |
| 2009/0030697 A1 | 1/2009 | Cerra et al. | |
| 2009/0043581 A1* | 2/2009 | Abbott et al. | 704/254 |
| 2009/0055185 A1* | 2/2009 | Nakade et al. | 704/257 |
| 2009/0055381 A1* | 2/2009 | Wu et al. | 707/5 |
| 2009/0271195 A1* | 10/2009 | Kitade et al. | 704/239 |
| 2010/0070268 A1 | 3/2010 | Sung | |
| 2010/0161313 A1* | 6/2010 | Karttunen | 704/9 |
| 2010/0305947 A1 | 12/2010 | Schwarz et al. | |
| 2011/0004462 A1* | 1/2011 | Houghton et al. | 704/9 |
| 2011/0029301 A1* | 2/2011 | Han et al. | 704/9 |
| 2011/0035210 A1 | 2/2011 | Rosenfeld et al. | |
| 2011/0077943 A1* | 3/2011 | Miki et al. | 704/250 |
| 2011/0131046 A1 | 6/2011 | Zweig et al. | |
| 2011/0296374 A1* | 12/2011 | Wu et al. | 717/104 |
| 2012/0022873 A1* | 1/2012 | Ballinger et al. | 704/275 |
| 2012/0029910 A1* | 2/2012 | Medlock et al. | 704/9 |
| 2012/0072215 A1 | 3/2012 | Yu et al. | |
| 2012/0150532 A1* | 6/2012 | Mirowski et al. | 704/9 |

OTHER PUBLICATIONS

Gildea etal. "Topic-based language models using EM." In Proceedings of Eurospeech, 1999, pp. 1-4.*

Iyer, et al. "Relevance weighting for combining multi-domain data for n-gram language modeling." Computer Speech & Language13.3, Jul. 1999, pp. 267-282.*

Sethy, et al. "Building topic specific language models from webdata using competitive models." INTERSPEECH, Sep. 2005, pp. 1-4.*

Heigold et al., "Investigations on Exemplar-Based Features for Speech Recognition Towards Thousands of Hours of Unsupervised, Noisy Data," Proceedings of the IEEE International Conference on Acoustics, Speech, and Signal Processing (ICASSP), IEEE, 2012, 4437-4440.

Wachter et al., "Template Based Continuous Speech Recognition," IEEE Transactions on Speech and Audio Processing, 15(4):1377-1390, 2007.

Zweig et al., "Speech recognition with segmental conditional random fields: A summary of the JHU CSLP 2010 summer workshop," in Proc. ICASSP, 2011, 5044-5047.

Zweig et al., "Speech Recognition with Segmental Conditional Random Fields: Final Report from the 2010 JHU Summer Workshop," Nov. 8, 2010, 80 pages.

Sainath et al., "Exemplar-based sparse representation phone identification features," in Proc. ICASSP, 2011, 4492-4495.

Heigold et al., "A flat direct model for speech recognition," in Proc. ICASSP, 2009, 4 pages.

Zweig and Nguyen, "SCARF: A segmental CRF approach to large vocabulary continuous speech recognition," in Proc. ASRU, 2009, 4 pages.

Wachter et al., "Outlier Correction for Local Distance Measures in Example Based Speech Recognition," IEEE 2007, 433-436.

Morris et al. "Conditional Random Fields for Integrating Local Discriminative Classifiers," IEEE Transactions on Speech and Audio Processing, 16(3):617-628, Mar. 2008.

Demuynck et al. "Progress in Example Based Automatic Speech Recognition" ICASSP, 2011, 4692-4695.

Seppi et al. "Template-based Automatic Speech Recognition meets Prosody," In proceeding of: INTERSPEECH 2011, 12th Annual Conference of the International Speech Communication Association, Aug. 27-31, 2011, 4 pages.

Aradilla et al. "Using Posterior-Based Features in Template Matching for Speech Recognition" ICLSP, 2006, 10 pages.

Kanevsky et al., "An Analysis of Sparseness and Regularization in Exemplar-Based Methods for Speech Classification," In proceeding of: INTERSPEECH 2010, 11th Annual Conference of the International Speech Communication Association, Sep. 26-30, 2010, 2842-2845.

Demange et al., "HEAR: An Hybrid Episodic-Abstract speech Recognizer," 10th Annual Conference of the International Speech Communication Association, 3067-3070, 2009.

Gaudard et al., "Speech Recognition based on Template Matching and Phone Posterior Probabilities," IDIAP, Feb. 2007, 33 pages.

Hoffmeister et al., "Cross-Site and Intra-Site ASR System Combination: Comparisons on Lattice and 1-Best Methods," IEEE International Conference on Acoustics, Speech and Signal Processing, ICASSP 2007, vol. 4, 4 pages.

Gemmeke et al. "Exemplar-based sparse representations for noise robust automatic speech recognition," IEEE Transactions on Audio, Speech, and Language Processing, 19(7):2067-2080, Sep. 2011.

Demuynck et al., "Integrating Meta-Information Into Exemplar-Based Speech Recognition With Segmental Conditional Random Fields," 2011 IEEE International Conference on Acoustics, Speech and Signal Processing (ICASSP), 5048-5051.

Seppi et al. "Data Pruning for Template-based Automatic Speech Recognition" INTERSPEECH 2010, 901-904.

Nguyen et al., "Speech Recognition with Flat Direct Models," IEEE J-STSP Special Issue on Statistical Learning Methods for Speech and Language Processing, 2010, 1-12.

Nederhof, "A General Technique to Train Language Models on Language Models," Association for Computational Linguistics, 31(2):173-185, 2005.

'CMUSphinx' [online]. "Open Source Toolkit for Speech Recognition," Carnegie Mellon University, Aug. 2, 2011 [retrieved on Dec. 16, 2011]. Retrieved from the internet: URL<http://cmusphinx.sourceforge.net/wiki/tutoriallm>, 3 pages.

* cited by examiner

SPEECH RECOGNITION USING TOPIC-SPECIFIC LANGUAGE MODELS

CROSS-REFERENCE TO RELATED APPLICATION

Priority is hereby claimed to U.S. Provisional Application No. 61/586,670, which was filed on Jan. 13, 2012. The contents of U.S. Provisional Application No. 61/586,670 are hereby incorporated by reference into this disclosure.

TECHNICAL FIELD

This disclosure generally relates to speech recognition.

BACKGROUND

Speech recognition refers to the process of converting spoken words to text. Speech recognition systems translate verbal utterances into a series of computer readable sounds which are compared to known words. For example, a microphone may accept an analog signal, which is converted into a digital form that is divided into smaller segments. The digital segments can be compared to the smallest elements of a spoken language, called phonemes (or "phones"). Based on this comparison, the speech recognition system can identify words by analyzing the sequence of the identified sounds to determine, for example, corresponding textual information.

A speech recognition system uses an acoustic model, a dictionary, and a language model to recognize speech. In general, an acoustic model includes digital representation of individual sounds that are combinable to produce a vast collection of words, phrases, etc. A language model assigns a probability that a sequence of words will occur together in a particular sentence or phrase. A dictionary identifies words in the input speech.

In general, building a language model includes obtaining a vocabulary and training data. The training data may include a corpus of data that reflects use of the language, e.g., documents, transcripts, e-mail, academic papers, novels, etc.

SUMMARY

Speech recognition techniques may include: receiving audio; identifying one or more topics associated with audio; identifying language models in a topic space that correspond to the one or more topics, where the language models are identified based on proximity of a representation of the audio to representations of other audio in the topic space; using the language models to generate recognition candidates for the audio, where the recognition candidates have scores associated therewith that are indicative of a likelihood of a recognition candidate matching the audio; and selecting a recognition candidate for the audio based on the scores. The speech recognition techniques may include one or more of the following features, either alone or in combination.

The techniques may include classifying documents by topic; classifying other audio by topic based on transcriptions of the other audio; and using the documents and the transcriptions as training data to generate the language models that correspond to the topics.

The language models may be first language models. Identifying language models that correspond to the topics may include: mapping the representation of the audio into the topic space, where the topic is inhabited by the other representations of other audio, and where the other audio has known content; identifying a number of the other representations that are within a range the representation of the audio in the space; and identifying second language models corresponding to the other audio having the other representations that are within the range. The first language models include the second language models.

The one or more topics may be identified based on at least one of metadata associated with the audio and a feature associated with the audio. Identifying the one or more topics may include: performing a speech recognition process on the audio using a general language model that is not topic-specific; and identifying the one or more topics based on recognition candidates for the audio produced by performing the speech recognition process.

The representation of the audio may include a vector representation having topics associated with the audio, and the representations of the other audio may include corresponding vector representations having topics associated with the other audio. The proximity may be determined by using cosine similarity to determine distances between the representation for the audio and the representations for the other audio, and selecting a subset of the representations for the other audio based on the determined distances.

The techniques may include performing a speech recognition process on the audio using a general language model that is not topic-specific to thereby produce one or more recognition hypotheses for the audio. Using the language models to generate recognition candidates for the audio may include re-scoring the one or more recognition hypotheses using the language models to produce the recognition candidates.

The one or more topics may be part of a topic hierarchy, and at least one of the topics associated with the audio may be at a higher level in the topic hierarchy than another one of the topics associated with the audio. Weights associated with the language models may be normalized such that a sum of the weights is one. A language model may be associated with a weight that corresponds, at least in part, to a relevance of the language model to the audio. The score of a language model may be adjusted based on a weight associated with the language model. The recognition candidate may be based on the adjusted scores.

Because people speak differently in different contexts (for example, people use different language patterns when discussing sports than when discussing politics) the outputs produced by a language model can be improved if the language model is tailored to one or more topics. Accordingly, the quality of the output of a language model can be improved if the language model is built from training data that is about the same, or similar, topics.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Described herein are processes for using topic-specific language models in speech recognition. The processes include, e.g., identifying topics associated with input audio, and identifying language models that correspond to the topics. For example, the topics may be identified by mapping a representation of the input audio into a topic space that is inhabited by other representations of other audio having known content, and identifying a number of the other representations that are within a range of the representation of the input audio in the space. Language models corresponding to the representations of other audio that are within the range are identified, and are used to generate a composite language model for the input audio. The composite language model is used to generate recognition candidates (also referred to as recognition "hypotheses") for the input audio. The recognition candidates have scores that are indicative of a likelihood of a recognition candidate matching the input audio. For each language model in the composite language model, a score is adjusted based on a weight associated with a corresponding language model to thereby produce adjusted scores. A recognition candidate is selected for the input audio based on the adjusted scores. Text corresponding to that recognition candidate may be generated and used in other processes. The text may be for all of the input audio or for a portion thereof.

Figure 1:
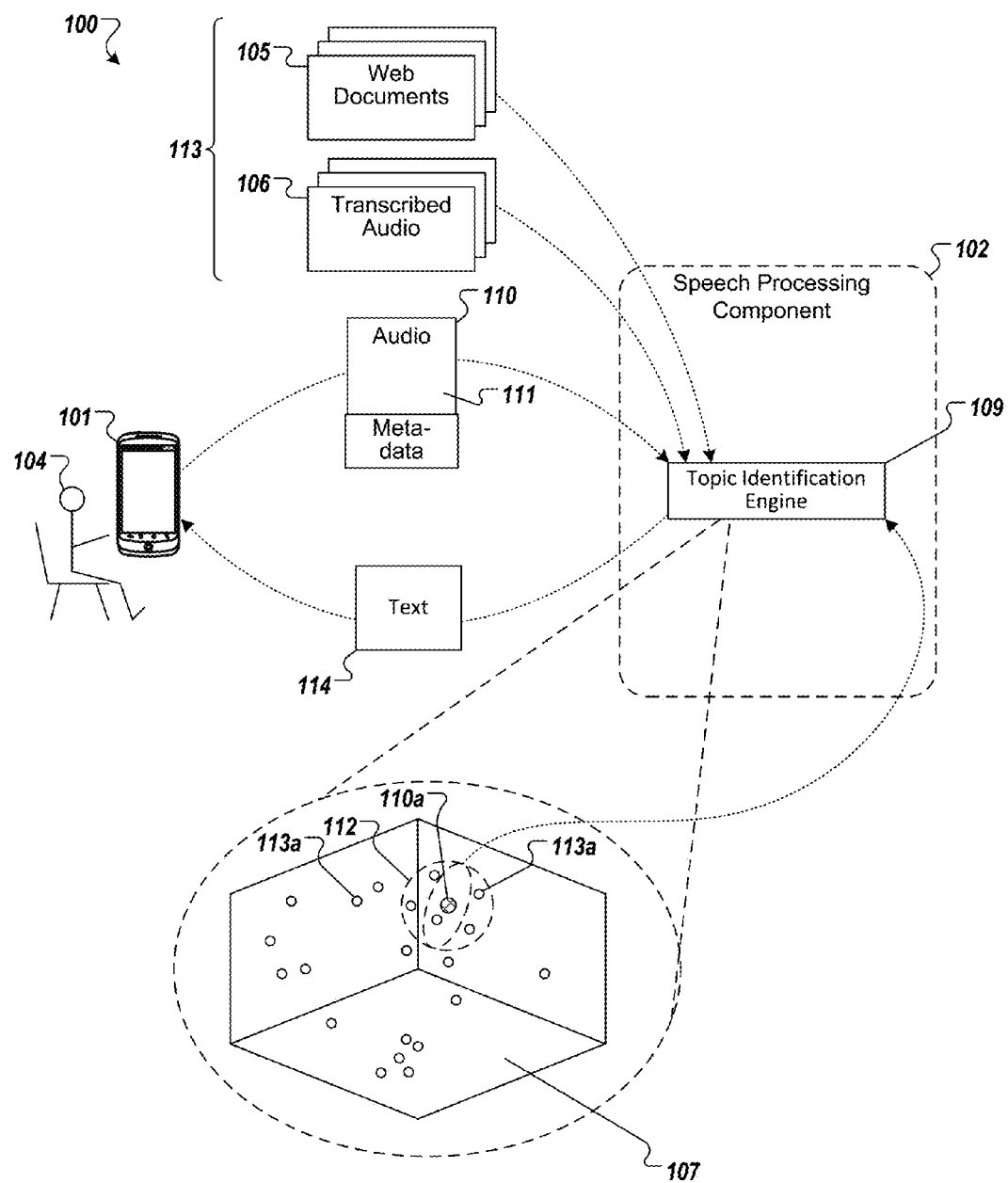
FIG. 1 shows, conceptually, an example of a process for recognizing speech.

FIG. 1 shows a conceptualized version of an example of a process 100 for recognizing speech using topic-specific language models. More detailed examples are provided in the subsequent figures and corresponding description.

In the example of FIG. 1, a collection of content 113 is processed by a speech processing component 102. The speech processing component 102 may be hosted by a server that is remote from computing device 101. For example, speech processing component 102 may be accessible through one or more Web sites, such as a video hosting site.

The content 113 includes a collection of Web documents 105, such as Web pages and word processing files that include written language content. The written language content of each of the Web documents 105 is relevant to one or more topics. The Web documents 105 are processed by a topic identification engine 109 to identify the one or more topics discussed or described by the Web documents.

The identified topics are used to define the dimensions of an N-dimensional (N>2) topic space. A simplified version of such an N-dimensional topic space 107 is shown in FIG. 1. In this example, the space 107 is three-dimensional. The dimensions in the N-dimensional space correspond to topics to which the Web documents 105 relate. For example, the N-dimensional topic space 107 may include the topical dimensions of "politics", "religion", and "science", and the content of substantially any given example of language (e.g., written document, transcribed audio) may correspond in varying degrees, including zero, to all three topics. In this three-topic example, the correspondences to the topics may be conceptualized as X, Y, and Z positions in a three-dimensional topic space. In some examples, the N-dimensional topic space 107 may include hundreds or thousands of dimensions corresponding to hundreds or thousands of topics.

The Web documents 105 are also analyzed by the topic identification engine 109 to construct topic language models. In some implementations, the topic language models can includes substantially all the words in a particular language (e.g., English, Spanish). The words are associated with a statistical probability of being used in a particular context. Examples of topic language models will be discussed further in the descriptions of FIGS. 2 and 3.

The content 113 includes a collection of reliably transcribed audio content 106, such as transcripts of spoken audio content that have been provided by human transcriptionists. The language content of each of the reliably transcribed instances of audio 106 is relevant to one or more of the N topics in the N-dimensional topic space 107. Each of the reliably transcribed instances of audio 106 is processed by the topic identification engine 109 to identify the one or more topics discussed or described by the audio content.

The relevance of each of the reliably transcribed instances of audio 106 to each of the N topics is determined. For example, an audio recording may be more relevant to the topic of "sports" than it is to the topics of "art" or "music". The correspondences between each of the reliably transcribed instances of audio 106 and the N topics is represented by an N-dimensional vector (e.g., or location) within the N-dimensional topic space. In the example of FIG. 1, the positions of vectors for the instances of audio are represented as points at various locations within the N-dimensional topic space 107. As such, two points in the N-dimensional topic space 107 can represent vectors (or other constructs) for two instances of audio that are both relevant to a substantially similar combinations of topics. In this regard, it is noted that the audio itself is not in the N-dimensional space, but rather the N-dimensional space include representations (e.g., vectors) for the audio.

During operation, a user 104 provides audio content 110 (e.g., the audio information included in a digital video file) to the topic identification engine 109. For example, the audio content 110 may be uploaded from computing device 101 or transferred to the speech processing component 102 from a remote location(s), such as video captured by a smartphone and uploaded to a video sharing service. In another example, the audio content 110 may be streamed from the computing device 101 as part of a telephone call, an audio conference, or the audio portion of a video conference.

The audio content 110 undergoes pre-processing by the topic identification engine 109 to identify topic language models that are to be used for subsequent speech processing operations. The pre-processing may include, e.g., analyzing collections of metadata 111 that are included in, or associated with, the audio content 110. The metadata 111 may include information (e.g., text) that describes the audio content 110, such as the name or title of the audio content, the identity of the user 104 who submitted the content, the identity of the person whose speech is captured by the content, a user description of the content, tags, classifiers, or other appropriate information that may be used to describe the audio content 110. The metadata 111 is analyzed to identify one or more topics to which the input audio content 110 may be related.

In another example, the audio content 110 may be preprocessed (e.g., transcribed) by a general language model (not shown). The general language model may be a language model that is trained with the general vocabulary and syntax of a language. By contrast, the topic language models are trained using documents, such as the Web documents 105, articles, or other content that is specific to a particular topic. As such, generally speaking, the topic language models may be more effective at recognizing words, word pairs, phrases, sequences of words and other word associations about a particular topic than would be a general language model not trained off of such topic-specific information. The general language transcript is analyzed to identify one or more topics to which the audio content 110 may be related.

By determining the one or more related topics, one or more topic language models that have a likelihood of being relevant to the spoken content of the audio content 110 may be identified. In an example described in more detail below, representations (e.g., vectors or other constructs) that represent features of audio content 110 are mapped to the N-dimensional ($N \geq 2$) topic space 107. In the example of FIG. 1, topics of the audio content 110 are represented as an N-dimensional vector that corresponds to a combination of topical relevancies in the N-dimensional space 107. In some implementations, the relative proximity of points in the N-dimensional space 107 representing two instances of audio (e.g., the audio content 110 and audio 113) can indicate that the two items both pertain to a similar combination of topics. Vectors descriptive audio, which are in the N-dimensional space 107, may be stored in a repository, and may be used to identify topic language models for use in speech processing, as described herein.

The topic identification engine 109, which may be part of, or associated with, the speech processing component 102 generates the vectors representing the audio content 110 and one or more of the instances of audio 113 that are also represented by like topic vectors. In the illustration of FIG. 1, a vector 110a for audio content 110 is represented conceptually as a point in the N-dimensional space 107, along with points representing vectors 113a for the other content 113 (e.g., electronic documents, reliable transcripts, etc.). The locations of the vectors for audio content 110 and the other content 113 represent each point's relevance to N topics. In this example, the topic identification engine 109 retrieves the identities of vectors for other content 113 that, in the N-dimensional space 107, are within a specified range of the vector for the audio content 110. The range may be user-specified or predefined. For example, vectors 113a for other content 113 within the range defined by sphere 112 may be selected as topic candidates. The range may be representative of electronic documents and audio transcripts having topics that are similar to (e.g., within a range of) corresponding topic(s) of the metadata 111. Although vectors are described herein, constructs other than vectors may be used in the processes described herein.

Other limitations may also be applied. For example, the number of vectors for other instances of audio 113 may be limited or certain topics may be excluded, to name a few. For example, the topic identification engine 109 may identify the three, five, ten, twenty, or any other appropriate number of other vectors that are closest to the vector for audio content 110 in the N-dimensional space 107. These limitations may be predefined or specified by a user on a per-item basis.

After the vector(s) for other content 113 closest to the vector for audio content 110 are identified, the audio content 110 is processed using a combination of one or more topic language models corresponding vectors for the number of nearest neighbors (e.g., K ($K \geq 1$) nearest neighbors) in the N-dimensional space. While identifying utterances included in the audio content 110, various recognition candidate words are identified from among the topic-specific language models (the general language model may be used to supplement the topic-specific language models). For example, an utterance may be identified as possibly being either "Boston" or "Austin". For example, the N-dimensional space 107 may include the topic dimensions of "Texas" and "Massachusetts", and in examples in which the topic of "Texas" has been associated with relatively greater mathematical weight than the topic of "Massachusetts", the recognition candidate "Austin" suggested by a "Texas" topic language model may be given a relatively higher probability of representing the utterance than may be given to the "Boston" recognition candidate suggested by a "Massachusetts" topic language model.

More specifically, after the position of the vector for audio content 110 is determined in the N-dimensional topic space 107 and the vectors for the K closest neighboring instances of audio 113 (e.g., within the sphere 112) are identified, the distances between the vector for audio content 110 and each of the vectors for the K closest neighbors may be used to determine how much mathematical weight each of the topic language models is assigned. That is, the particular combination of topics associated with the vector for audio content's 110 closest neighboring vectors may influence the overall determination of topic weights assigned to the language models. For example topics associated with vectors for audio that are farther from vectors for audio content 110 within sphere 112 may be given less weight than vectors for audio that are closer to vectors for audio content 110. In some implementations, the mathematical weighting may be determined, at least in part, through an expectation maximization process.

The audio content 110 is processed using the one or more weighted topic language models that correspond to the topics in the N-dimensional space. As utterances are processed, the associated topic language models provide recognition candidates (e.g., words that are statistically likely to represent the utterance in the context of their respective topic). The mathematical weights associated with each of the topic language models are incorporated into the overall selection of the word that is most likely to represent the utterance from among all the recognition candidates. For example, a "Massachusetts" topic language model may identify an utterance as having a 90% likelihood of being the word "Boston", while a "Texas" topic language model may identify the utterance as having a 90% likelihood of being the word "Austin". In examples where the audio content is determined to have an 80% correspondence to the topic of "Massachusetts" and a 20% correspondence to the topic of "Texas", the recognition candidate "Austin" may be given a higher probability score (e.g. 0.90× 0.80=0.72) of representing the utterance than may be given the recognition candidate "Boston" (e.g., 0.90×0.20=0.45).

The highest-scoring recognition candidate(s) may be selected from among the topic language models to generate the text transcript 114, and the text transcript 114 is provided to computing device 101.

In some implementations, the text transcript 114 may not be directly provided to the user 104. For example, the text transcript 114 may be used by an Internet search engine in order to identify and provide, to the user, videos that relate to an input search query. In another example, the text transcript 114 may be used to determine advertisements related to the topic of the audio content 110, and may be provided in conjunction with playback of the audio content 110. In another example, audio of a telephone conversation or videoconference may be processed to provide information that augments the conversation (e.g., one person speaks an address, the speech processing component 102 recognizes the speech as a physical address, and responds by providing a map image of the spoken address).

Figure 2:
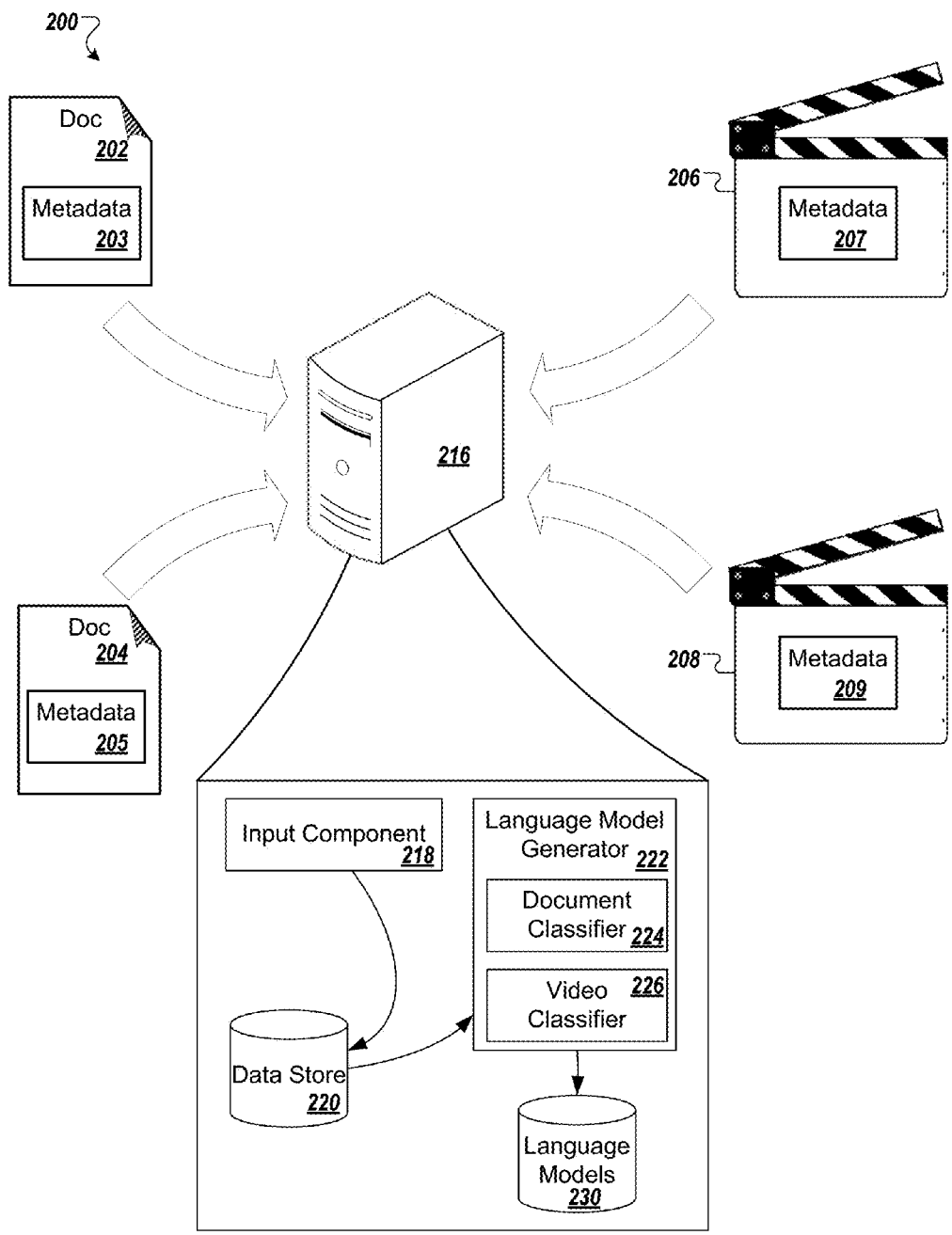
FIG. 2 illustrates an example of a system for generating language models from electronic documents.

FIG. 2 illustrates an example of a system for generating language models from electronic documents. Electronic documents 202 and 204 (e.g., Web pages, word processing files, text files) are provided to a server 216 hosting a speech processing component such as the speech processing component 102 of FIG. 1. In this example, the electronic document 202 is associated with a collection of descriptive metadata 203 (e.g., text), and the electronic document 204 is associated with a collection of descriptive metadata 205. For example, the electronic documents 202 and 204 may be Web documents, Web pages, word processing files, or any other appropriate electronic data that includes textual language content. Each of the electronic documents 202, 204 may include metadata 203, 205 providing, e.g., the title of the document, the identity of the author, a summary of the content, date and time stamp information, and any other appropriate information that may be associated with the electronic documents 202 and 204.

Electronic media files 206 and 208 that include, e.g., recordings of speech sounds (e.g., digital video files, digital audio files) are also provided to the server 216. In this example, electronic media file 206 is associated with a collection of descriptive metadata 207, and electronic media file 208 is associated with a collection of descriptive metadata 209. For example, electronic media files 206 and 208 may be digital videos, and each may include metadata 207, 209 providing, e.g., the title of the video, a description of the video, geo-location data, date and time stamp information, identifier(s) of the submitting user(s), user-provided tagging information, user-provided categorization information, and any other appropriate information that may be associated with the media files 206 and 208.

An input component 218 can process text from electronic data sources, for example, the electronic documents 202 and 204 and the electronic media files 206 and 208. Although only four instances of audio are shown, any number (e.g., thousands, hundreds of thousands, millions, etc.) of instances of audio may be processed. In some scenarios, the input may be in the form of vocal utterances provided over a microphone or as text entered onto a keyboard. The input component 218 can store a text version of the input in a data store 220.

A language model generator 222 can generate one or more language models (e.g., topic-specific language models) based on the data in the data store 220. The language model generator 222 includes a document classifier 224 and a video classifier 226. The document classifier 224 analyzes electronic documents such as the electronic documents 202 and 204 to identify one or more topics that are relevant to the content of each of the documents. For example, the electronic documents 204 may be a news story about a hurricane, and the document classifier 224 may classify the electronic document 204 as belonging to a collection of other electronic documents that are also associated with the topic of "meteorology".

The video classifier 226 analyzes video or other media files such as the electronic media files 206 and 208 to identify one or more topics that are relevant to the content of each of the files. In some implementations, the video classifier 226 may use the metadata associated with the files to perform its classification. For example, metadata 207 associated with the electronic media file 206 may provide an indication of the topic(s) of the media content of the electronic media file 206.

In some implementations, the video classifier 226 may use transcript data associated with the files to perform its classification. For example, the electronic media file 208 may include a transcript of speech sounds included in the media content of the electronic media file 208. In some implementations, the transcripts may be provided by human transcriptionists. In some implementations, the transcripts may be provided by an automated speech processing component.

The language model generator 222 can generate contextually aware topic-specific language models. For example, the language model generator 222 may generate a language model that is specific to one or more classifications of the electronic documents 202 and 204 and/or the electronic media files 206 and 208. For example, the document classifier 224 and the video classifier 226 may identify a collection of documents and files that pertain to a particular topic, and the language model generator 222 may process the documents and files in that collection to generate a language model of the words, word pairs, phrases, and so forth that commonly appear in relation to the particular topic. For example, the electronic media files 206 and 208 may be associated with the topic of "mathematics", and the language model generator 222 may analyze the electronic media files to determine that the topic of "mathematics" includes non-general words such as "eigenvalue", "abscissa", and "Fourier", and includes such words in specific contexts in a "mathematics" topic language model. A language model store 230 stores the language models for later use. The language models can later be used when additional electronic documents and/or media files are provided to the server 216.

The language model generator 222 may assign one or more mathematical weights that represent the correspondences between the electronic documents 202 and 204 and the electronic media files 206 and 208 to one or more topics (e.g., the N topics of the N-topic space 107 of FIG. 1).

As described below, input audio (e.g., audio content 110) is processed, such as by analyzing metadata associated with the input audio or by pre-recognizing the utterances in the input audio using a general language model, to determine one or more topics to which the input audio may pertain and to map vectors for the input audio to a position in an N-dimensional topic space. A collection of topically similar content is identified from among the electronic documents 202 and 204 and the electronic metadata files 206 and 208 by using corresponding vectors that have previously been mapped into the N-dimensional topic space. In this regard, vectors that have been previously mapped may be for audio for which reliable transcriptions (e.g., human transcriptions) are available. For example, the input audio vector's K—in this example, five—nearest neighbors in the N-topic space can be identified as representing the five most topically similar items relative to the input audio. In this example, "nearest neighbors" constitute vectors in the space that are within a predefined distance from the vector for the input audio in the space. The topic language models associated with each of the nearest neighbors are identified (e.g., by reference to a database), and those language models are used to recognize the input audio.

In some implementations, the relative distances between the vector for input audio and vectors for each of the topically similar items may be used to associate a mathematical weight to each of the above-identified topic language models (e.g., the topic language models of relatively closer similar vectors may be given relatively greater statistical weights than may be given to topic language models of relatively less similar vectors). The identified topic language models are used to identify recognition candidates for utterances detected in the input audio, and the weights are used in processes for statistically ranking the recognition candidates to determine the word(s) that were most likely spoken in the input audio in the context of the identified topic(s).

The metadata provided with an electronic media file may suggest that the file may be associated with more than one topic. For example, the electronic media file 206 may be associated with the title "Olympic Hockey". Such a title may suggest that the speech in the file may pertain to topics such as "sports" and "ice hockey". Given the international nature of the Olympics, however, the title may also suggest that the speech in the file may pertain to the topic of "politics" as well.

Figure 3:
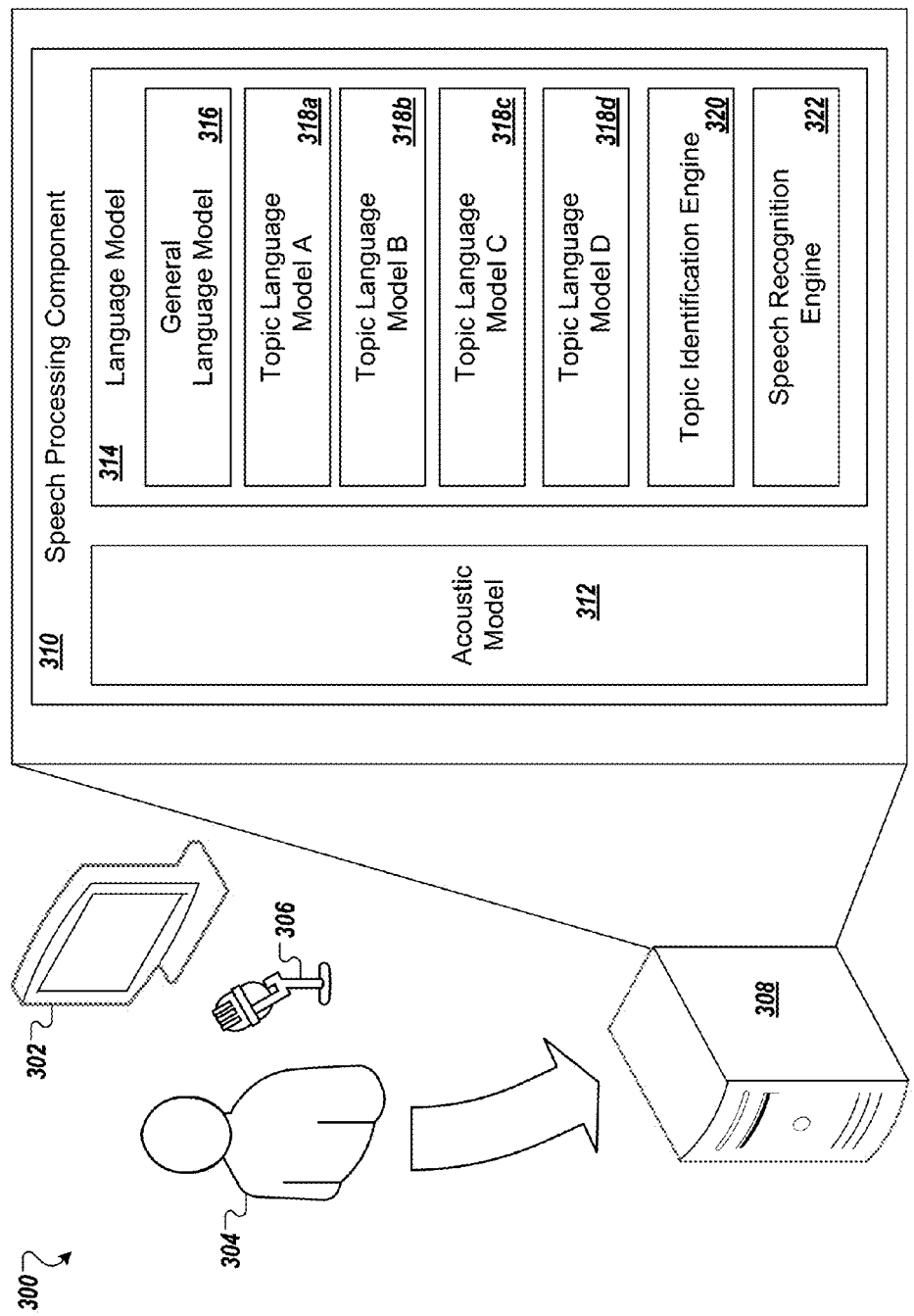
FIG. 3 illustrates an example system for recognizing speech.

FIG. 3 illustrates an example system for performing speech recognition. In this example arrangement, user 304 speaks into a microphone 306 of computer system 302. Computer system 302 may be a standalone computer connected to a network or any computational device connected to a microphone, for example, a personal computer, a tablet computer, a smart phone, etc.

The user's speech is sent to computer system 308 over a network (not shown), e.g., the Internet. The computer system 308 includes a speech processing component 310. In some implementations, the computer system 308 may be the server 216 of FIG. 2. The speech processing component 310 may be the speech processing component 102 of FIG. 2.

The speech processing component 310 includes an acoustic model 312, a language model 314, and a dictionary (not shown). For example, the acoustic model 312 can recognize sounds in utterances of speech. Language model 314 is a composite model, in this example, in that it includes both general and topic-specific language models. The topic language models 318a-318d, one or more of which are selected and weighted according to the processes described herein, identify recognition candidates that correspond to the recognized phonetic patterns. Based on the mathematical likelihoods of the recognition candidates and the weights associated with the topic language models, a recognition candidate is selected. The speech processing component 310 may then access the dictionary to identify spellings for the selected recognition candidate.

In more detail, the acoustic model 312 maps the sounds collected from the user 304 into component parts, called phonemes (or "phones"), which can be considered as basic elements of speech. For example, the English language can be spoken using approximately 40 phones. The acoustic model 312 accepts sounds and maps them to corresponding phones. From the phones, the acoustic model 312 can determine one or more words that the user 304 may have spoken.

Even when using an appropriate acoustic model, the basic elements of speech can be identical or very similar. For example, an acoustic model alone cannot distinguish homonyms such as "red" and "read". As another example, an acoustic model may have difficulty with words that are not homonyms but sound very similar, like "Boston" and "Austin". In order to improve accuracy and select the correct word, the speech processing component 310 uses the acoustic model 312 to identify the language model 314 to identify recognition candidate words that may correspond to the sounds identified by the acoustic model.

The language model 314 contains, among other things, statistical representation of how often words co-occur in particular general or topic-specific contexts. Words are said to occur if they are used in a sentence without any intervening words. For example, in the phrase "the quick brown fox jumped over the lazy dog" co-occurrences of two words include "the quick", "quick brown", "brown fox", "fox jumped", "jumped over", "over the", "the lazy", and "lazy dog". Co-occurrences of three words include "The quick brown", "quick brown fox", "brown fox jumped", "fox jumped over", "jumped over the", "over the lazy", "the lazy dog".

As described herein, language model 314 can be customized based on a specific topic. Multiple language models can be selected and combined to create a resulting composite language model. A language model may segment training data into two or three word parts. For any two words in the model, the model includes a probabilistic distribution as to the identity of the third word. For example, the language model presented with the words "Texas weather" can determine that the third word is likely "Austin" and not "Boston."

In the example of FIG. 1, the language model 314 may include a general language model 316. General language model 316 is representative of how a language, for example English, is generally spoken. General language model 316 need not be topic-specific, and may be generalized using standard word patterns in a language (e.g., the included words are weighted based on the statistical likelihood that each will be used in everyday speech patterns).

In some implementations, the topic language models 318a-318d may each include substantially the same words as the general language model 316, but have different weights associated with each of the included words based on the statistical likelihood of each of those words appearing in speech related to the respective topic associated with the topic language models. For example, the general language model 316 and an "anatomy-specific" topic language model may both include the word "coccyx", but the word "coccyx" may be given a higher statistical likelihood of being used in a particular context (e.g., in a word sequence) of "anatomy" than it is of being used in general speech.

In some implementations, the general language model 316 may include substantially only words that are non-topical in nature (e.g., "he", "she", "and", "jump"), and topic language models may include words that are associated with the respective topic and not included in the general language model 316. For example, the general language model 316 may include the word "tree", but a "botany" topic language model may include the words "coniferous" and "eucalyptus" that may be likely to be used in everyday speech. In implementations in which the topic language models supplement the general language model, the general language model and the identified topic language model(s) may be used conjunctively in the speech recognition processes described herein.

In some implementations the topics can be part of a topic hierarchy. At least one of the topics associated with input audio may be associated at a higher level in the topic hierarchy than another one of the topics associated with the audio. For example, topic language model 318a may pertain to the topic of "North America", the language model 318b may pertain to the topic of "the United States", and topic language model 318c may pertain to the topic of "Massachusetts". In this example, the topic language model 318c can be a subtopic of the topic language model 318b, which in turn can be a subtopic of the topic language model 318a. As such, an audio discussion about the city of "Boston" may align with the topics of the topic language models 318a-318c at different levels of the topical hierarchy.

A topic identifier engine 320 processes words, phrases (e.g., series of words), clusters (e.g., collections of words used in proximity to each other), and any other appropriate sounds or combination of sounds to identify one or more topics, and by extension, topic language models, with which the words, phrases, clusters and/or sounds are associated. In this example, the topic identifier engine 320 associates a statistical weight with each corresponding topic and topic language model based, e.g., on proximity of a representation of audio of the user's 304 audio to representations of other audio in a topic space (e.g., the topic space 107 of FIG. 1). In some implementations, the topic identifier 320 may associate a vector for the user's audio 304 with a collection of vectors for other audio in a topic space (e.g., the K nearest neighbors in an N-dimensional space) based on words included in metadata associated with the user's 304 speech (e.g., the title, caption, or description of a multimedia stream that includes speech audio) and/or words, phrases, and groups, identified from the user's audio using the general language model 316 in a speech recognition pre-processing process.

A speech recognition engine 322 processes the sounds collected from the user 304 to identify words included in the sounds and to provide phonetic descriptions of those words to a dictionary component, which provides actual text corresponding to the phonetic descriptions. The speech recognition engine 322 uses one or more of the topic language models to process the sounds to produce the textual data. For example, the topic identifier engine 320 may determine that the sounds are associated with the topic of "medicine", and assign a relatively high topical relevance score to a topic model that includes medical terminology and jargon. The speech recognition engine 322 uses the statistical weighting to identify one or more of the topic language models 318a-318d for use in processing the sounds. Continuing the previous example, the speech recognition engine 322 may use the relatively high relevance score to identify and/or associate a relatively high statistical weight with a "medicine" topic language model, and use the "medicine" topic language model to recognize the speech such that recognition candidates for medical terms and jargon in the speech (e.g., anatomical terms, pharmaceutical names, pathogen names) may have a relatively higher likelihood of being selected as correctly identifying the words in the speech compared to recognition candidates corresponding to less relevant topics.

In some implementations, the sounds collected from the user 304 may be processed in two or more passes. The sounds may be processed by performing a speech recognition process on the audio using a general language model that is not topic-specific, and then identifying the topics based on recognition candidates for the audio produced by performing the speech recognition process. For example, the user's speech may be processed by the speech recognition engine 322 using substantially only the general language model 316. The general language model 316 may include words such as "south", "Dakota", and "vacation". Based on these words, the topic identifier engine 320 maps vectors for the audio into the N-dimensional topic space to identify other similarly-mapped vectors (e.g. that are associated with reliably-transcribed audio). Based on vectors for the audio and other audio in the topic space, the topic identifier engine 320 may determine that recognition candidates provided by a "South Dakota" topic language model are to be given relatively higher statistical weights in subsequent speech recognition operations performed on the audio. As such, the speech recognition engine 322 may have an increased likelihood of using the recognition candidates provided by the "South Dakota" topic language model for subsequent processing of additional words (e.g., to distinguish the term "Mt. Rushmore" from the phrase "mount rush more", the proper noun "Badlands" from the general phrase "bad lands", or the proper noun "Rapid City" from the general phrase "rapid city").

Figure 4:
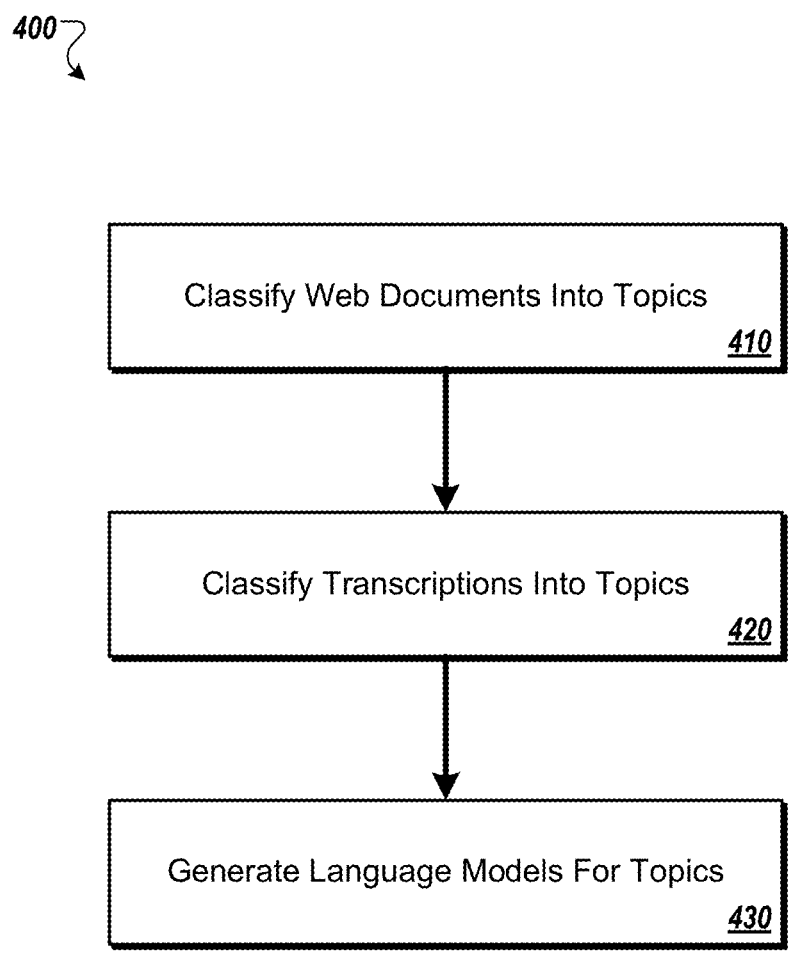
FIG. 4 is a flow diagram showing an example process for generating language models.

FIG. 4 is a flow diagram for an example process 400 for generating language models. In some implementations, the process 400 may be performed by the speech processing component 102 or 310 and corresponding server.

The process 400 classifies (410) documents by topic. For example, the document classifier 224 may process the electronic documents 202 and 204 into categories according to the topic or topics of the textual content, metadata 203 and 205, tags, author information, submitting user information, or any other appropriate information associated with the electronic documents 202 and 204.

In some implementations, each of the associated topics can be given a score that represents how strongly the topic correlates to a selected document, and the associated topic with the highest score can be used to identify the topic for which the selected document is to be used as training data. For example, the electronic document 202 may mainly discuss the topic of "exercise" while also mentioning the topics of "diet" and "medicine", therefore the topic of "exercise" may be ranked higher than the other topics, and the electronic document 202 may be used to train a topic language model for the topic of "exercise".

The process 400 classifies (420) other audio by topic based on transcriptions of the other audio. In some implementations, the transcriptions of the other audio may be reliably accurate transcripts, such as transcripts produced by human transcriptionists. For example, the video classifier 226 may process manual transcriptions of electronic media files 206 and 208 (e.g., video) into categories according to the topic or topics of the transcribed audio content and/or from the metadata 207 and 208, tags, speaker information, submitting user information, or any other appropriate information associated with the electronic media files 206 and 208. In some implementations, a combination of interpolation weights can be selected for audio for which a reliable transcript is available. For example, the reliable transcript of the electronic media file 206 may be analyzed to identify the topics discussed in the transcript as well has how strongly each topic among a set of available topics corresponds to the content of the transcript. An expectation maximization algorithm can be used to determine the weights.

The process 400 uses the documents and the transcriptions as training data to generate (430) topic-specific language models. For example, the text of the electronic documents 202 and 204 and the transcripts of the electronic media files 206 and 208 associated with one or more topics can be processed to identify words, phrases, word groupings, and other appropriate language constructs that are used when discussing or describing the associated topic(s). These identified words, phrases, word groupings, and language constructs can be used to construct one or more topic language models for the associated topics.

In some implementations, the process 400 can identify the sources of the documents in order to classify the topics of the documents. For example, the electronic documents 202 and 204 and/or the electronic media files 206 and 208 may be found on a common network resource (e.g., a Web site known to be substantially devoted to sports, religion, technology, etc.).

In some implementations, the process 400 can identify key pieces of information from users' profiles in order to classify the topics of the user's documents and audio files. For example, the electronic media file 208 may be a video blog entry submitted by a user who routinely submits videos pertaining to cooking, and therefore the electronic media file 208 may be tagged as having a high probability of including content that also pertains to the topic of "cooking". In another example, a new video's metadata, uploading user's profile or history, or hosting location may indicate that the video is likely to pertain to the topics of "agriculture" and "veterinary science", and may use this information categorize the video as being likely to pertain to the topics of "agriculture" and "veterinary science".

Figure 5:
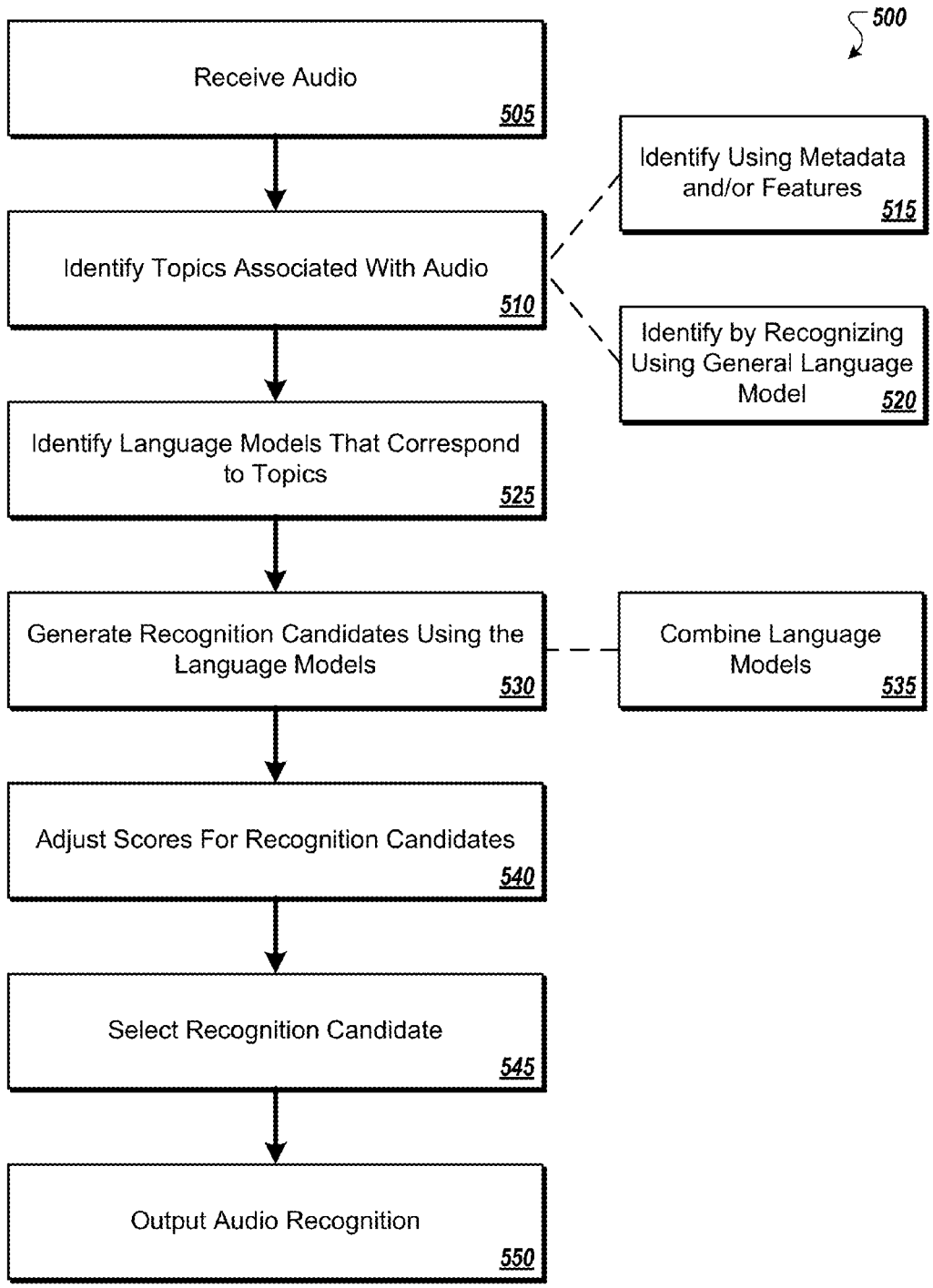
FIG. 5 is a flow diagram showing an example process for recognizing speech.

FIG. 5 is a flow diagram for an example process 500 for recognizing speech. In some implementations, the process 500 may be performed by the speech processing component 102 or 310 and corresponding server.

Process 500 receives (505) audio. For example, the speech processing component 102 can receive the audio content 110 from the user 104. The process 500 identifies and associates (510) topics with the audio. In some implementations, the identification and association (510) may be performed (515) using metadata, such as that described herein. In some implementations, the identification and association (510) may be performed (520) using a general language model that is not topic-specific. For example, the topics can be identified based on recognition candidates for the audio produced by performing the speech recognition process using the general language model. For example, the speech recognition engine 322 may use the general language model 316 as part of a process to recognize speech audio provided by the user 304. The words and speech patterns recognized through the use of the general language model 316 can then be used by the topic identifier engine 320 to identify one or more topics associated with the speech audio. For example, the general language model 316 may recognize enough words in an example sample of audio to determine that the user 304 is speaking about the topic of "geology" (e.g., by identifying general words such as "rock", "layer", "formation", "mountain").

In some implementations, a speech recognition process may be performed on audio using a general language model that is not topic-specific to thereby produce one or more recognition hypotheses for the audio. For example, the user's 304 speech may be first partly or wholly transcribed using the general language model 316. The transcription may then be analyzed to determine one or more possible topics to which the speech may pertain. Topic language models corresponding to the possible topics may then be used, as described below, to re-score the recognition candidates identified during the initial transcription in order to improve the recognition of words in the context of their respective topic spaces. The lattice re-scoring technique may be used to perform the re-scoring.

Language models that correspond to the topics are identified (525). Each of the language models may be associated with a weight that corresponds to a topic. In some implementations, the language models may be identified based on proximity of a representation of the audio to representations of other audio in a topic space (e.g., the N-dimensional topic space 107). For example, the metadata 207 of the electronic media file 206 may be analyzed to determine one or more topics that may be spoken about in the audio of the file. Other texts, such as the electronic documents 202 and 204 and/or text transcripts of previously transcribed electronic media files may also exist, and the relative similarities between the topics of the electronic media file 206 and the other texts may be used to determine one or more topical proximities to the content of the other topics. Such implementations are discussed in further detail in the description of FIG. 6.

In some implementations, the language models may be identified based on topics identified or associated with the audio. For example, the audio may have been manually tagged with the topic of "astronomy", and a topic identifier may use that tag to identify an "astronomy" topic language model to use in subsequent processing of the audio. In another example, a pre-processing operation using a general language model may identify a relatively large number of general language words that pertain to the topic of "fashion" (e.g., "style", "Paris", "model", "design", "runway"), and a topic identifier may use such information to identify a "fashion" topic language model to use in subsequent speech processing of the audio.

In some implementations, input audio may be run through all available topic language models, and the resulting recognition hypotheses may be analyzed to determine which one is best.

The process 500 uses the language models to generate (530) recognition candidates for the audio. The recognition candidates are associated with scores that are indicative of the likelihood of each recognition candidate being used in the context of the topic associated with the recognition candidate's corresponding language model. For example, for input relating to "global warming" the topic identifier engine 320 may select three of the topic language models 318a-318d that pertain to the topics of "climatology", "politics", and "energy". Although an example implementing three topics is discussed here, any appropriate number of topics may be associated with a document or audio file. For example, some audio content may relate to only one topic, whereas another may include speech that combines and meanders across dozens of topics or more.

In some implementations, the process 500 may combine (535) the language models in a composite language model that is used to generate (530) the recognition candidates, as described herein. For example, the statistical weights associated with language models may be combined with probabilities associated recognition candidates produced by corresponding language models to form combined statistical weights for various recognition candidates. The combined weights may be used by the process 500 when selecting recognition candidates in speech recognition processes, as described below.

More specifically, more than two language models may be combined to form the composite language model. In some implementations, each of the language models may be associated with a weight that corresponds to a topic. For example, the user 304 may submit a video in which he or she discusses recipes for cooking garden-raised vegetables. In such an example, the video may include speech that relates to multiple topics, such as "cooking" and "gardening". In this example, the video may primarily discusses cooking but may also diverge briefly into related gardening techniques. As such, the topic of "cooking" may be given a relatively high statistical weight, the topic of "gardening" may be given a relatively lower weight, and other topics that are substantially unrelated to the video (e.g., "physics", "metallurgy") may be given substantially zero statistical weight.

In some implementations, the language models may be used to generate recognition candidates for the audio, and the recognition candidates may be associated with scores that indicate the likelihood that a recognition candidate will match an utterance detected in the audio. Continuing the example of the cooking video, the "cooking" language model may include relatively higher statistical weights for candidate recognition words such as "sauté" and "hollandaise" relative to non-cooking terms such as "mountain" or "Austin", and the topic identifier engine 320 may be more likely to select recognition candidates provided by the "cooking" language model than it would be to select recognition candidates identified by other language models.

For each language model, the process 500 adjusts (540) a score based on a weight associated with a corresponding language model to thereby produce adjusted scores. For example, an unknown word may be one of several similar-sounding words that are associated with different topics; an unknown word may sound like either "Austin" or "Boston". If the topic of the speech in which the word is spoken is associated with the topic of "Massachusetts" and an associated "Massachusetts" topic language model, then the words in that topic language model (e.g., "Boston") will have their scores adjusted relatively higher than other, similar-sounding words that occur in relatively lower-weighted topics (e.g., "Austin"). In such an example, both of the recognition candidates "Boston" and "Austin" would be identified as possible representations for the unknown word, but the word "Boston" will be selected because its weighted and normalized score is increased by the relatively higher statistical weight associated with the identified "Massachusetts" topic language model (e.g., compared to the score given by the word "Austin" associated with the "Texas" topic language model, which is lower weighted in this example). In some implementations, the weights associated with the corresponding language models may be normalized. For example, the weights associated with each of the corresponding language models may be summed to a value of "1". The normalized weight of each corresponding language model is then associated with recognition candidates suggested by the corresponding language model to adjust each recognition candidate's score.

The process 500 selects (545) a recognition candidate for the audio based on the adjusted scores. Continuing the "Austin/Boston" example, the recognition candidate word "Austin" will have a high score within the relatively low-weighted "Texas" topic language model, whereas "Boston" will have a high score within the relatively heavily-weighted "Massachusetts" topic language model. When the scores for the "Austin" and "Boston" recognition candidates are combined with their statistical weights associated with their respective topic language models and then normalized, the recognition candidate word "Boston" will score relatively higher than the recognition candidate word "Austin" as being the word that was spoken; therefore "Boston" may be the word selected for the utterance spoken in the audio. A resulting phonetic representation of the word "Boston" is then used by a dictionary component to perform a dictionary search to identify the correct spelling of the word "Boston". The process 500 then outputs (550) text for the audio recognition candidate with the best probability of matching the input audio. For example, the correctly spelled word "Boston" may be used to represent the spoken utterance in a text transcript of the audio.

Figure 6:
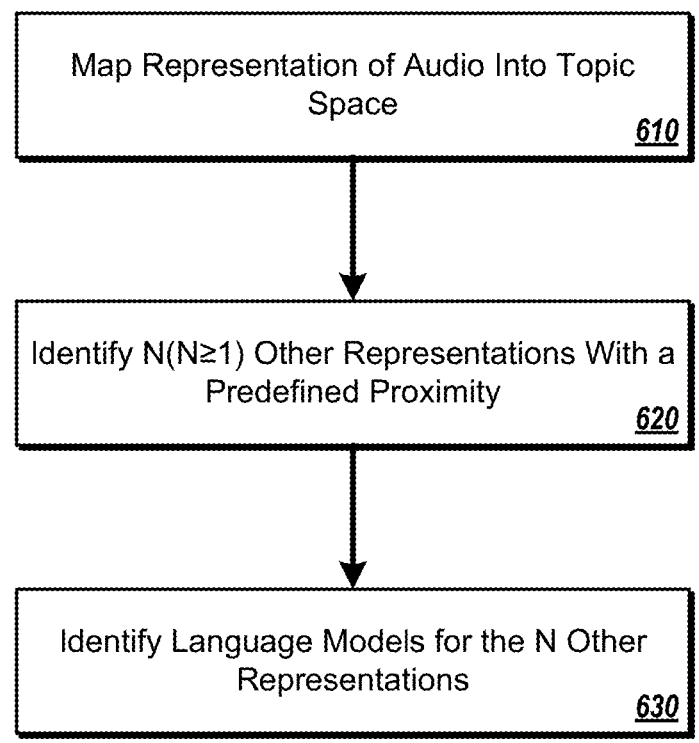
FIG. 6 is a flow diagram showing an example process for identifying language models.

FIG. 6 is a flow diagram for an example process for identifying topics. In some implementations, process 600 may be performed by speech processing component 102 or 310 and corresponding server. In some implementations, the process 600 may be part of the identification (525) operation of process 500.

The process 600 maps (610) a representation (e.g., vector) of input audio into a topic space. The topic space is inhabited by other representations of other audio. In this example, the space has the same dimensions for audio-based content (e.g., transcriptions of video) and for non-audio-based content (e.g., Web documents). Vectors for audio content 110 may be mapped into the N-dimensional topic space 107. The same topic space may also contain vectors for other electronic media files that have already been reliably transcribed to determine their spoken content. In some implementations, the reliably transcribed electronic media files have been previously transcribed by human transcriptionists, and the content of these manual transcripts can be used to determine N-dimensional vectors that map the relevancies of the manual transcripts to each of the N topical dimensions of the topic space (e.g., the space 107).

One or more other representations that are within a predefined range of the representation of the audio in the space are identified (620). For example, vectors for previously-transcribed audio recordings may be selected based on the topical proximity (e.g., determined distance) of those vectors to the vector for the input audio. In the example of FIG. 1, the predefined range is conceptually illustrated by the sphere 112, which includes the representation of the audio content 110 and of the other nearby instances of audio 113. However, where more than three dimensions are present, construct(s) other than a sphere may be used to identify proximity.

In some implementations, the determination of the predefined range or topical proximity can include using cosine similarity to determine distances between the representation for the audio and the representations for the other audio, and selecting a subset of the representations for the other audio based on the determined distances. For example, in geometric terms, the representation of the audio and the representations of the other audio may each be represented by a vector. The similarities between the representation of the other audio and each of the representations of the other audio may be measured by determining the cosine of the angle between their corresponding vectors. A predetermined angular difference threshold between the vector for the audio and the vectors of the other audio can be used to identify the other audio that is topically the most similar to the audio (e.g., to identify the audio's closest K (K≥1) neighbors in the N-dimensional topic space 107).

The process 600 identifies (630) one or more second language models corresponding to the other audio having the other representations that are within the range. For example, vectors for the instances of audio 113 within the sphere 112 can be the vectors of the K nearest reliably-transcribed audio content relative to the vector representation of the audio content 110. The topic language models associated with the vectors for each of the K nearest instances of audio 113 within the sphere 107 are used to identify corresponding topic language models.

In some implementations, the representation of the audio can be a vector representation that includes topics associated with the audio, and the representations of reliable (e.g., humanly transcribed) audio transcripts can include corresponding vector representations of topics associated with the reliable audio transcripts. For example, audio recordings may be associated with a number of topics, in which each topic is treated as a different dimension in a multi-dimensional topic space. In geometric terms, a three-dimensional direction may be described in terms of X, Y, and Z component magnitudes; however, in this context of this implementation, the number of dimensions may be any appropriate number (e.g., up to 1200 in some examples).

In this regard, recorded discussions often pertain, in varying degrees, to multiple topics. For example, a video of an interview on the topic of "global warming" may include elements of topics (e.g., dimensions) such as "climatology", "politics", and "energy". As such, the video may be represented by a topic vector that represents these three component topics. Another audio recording may be a discussion of the 1970's oil embargo, and include elements of topics such as "politics", "energy", and "economics". As such, the "embargo" audio may be represented by another vector that represents its own component topics. In this example, the two vectors may differ due to differences in their component dimensions (e.g., "climatology" versus "economics") and/or magnitudes of their component contributions. For example, both audio samples include the topic of "politics", but the "embargo" discussion may detail political actions in relatively greater detail than does the "global warming" discussion).

In some implementations, weighted probabilities produced by various language models may be normalized such that a sum of the weighted probabilities is one. For example, the weighted probabilities of recognition candidates may be summed, and then each of the weighted probabilities may be divided by the sum to determine a normalized weighted probability for each of the corresponding recognition candidates. The normalized weighted probabilities may be compared in order to determine which recognition candidate is a best match for input audio.

The processes described herein and variations thereof (referred to as "the processes") may contain functionality to ensure that party privacy is protected. To this end, the processes may be programmed to confirm that user information is publicly known before divulging that information to another party. In this regard, privacy features may be provided to enable a user with an opt-in or opt-out option to allow or to prevent, respectively, their private or proprietary content from being used in any manner that the user has not previously authorized.

Figure 7:
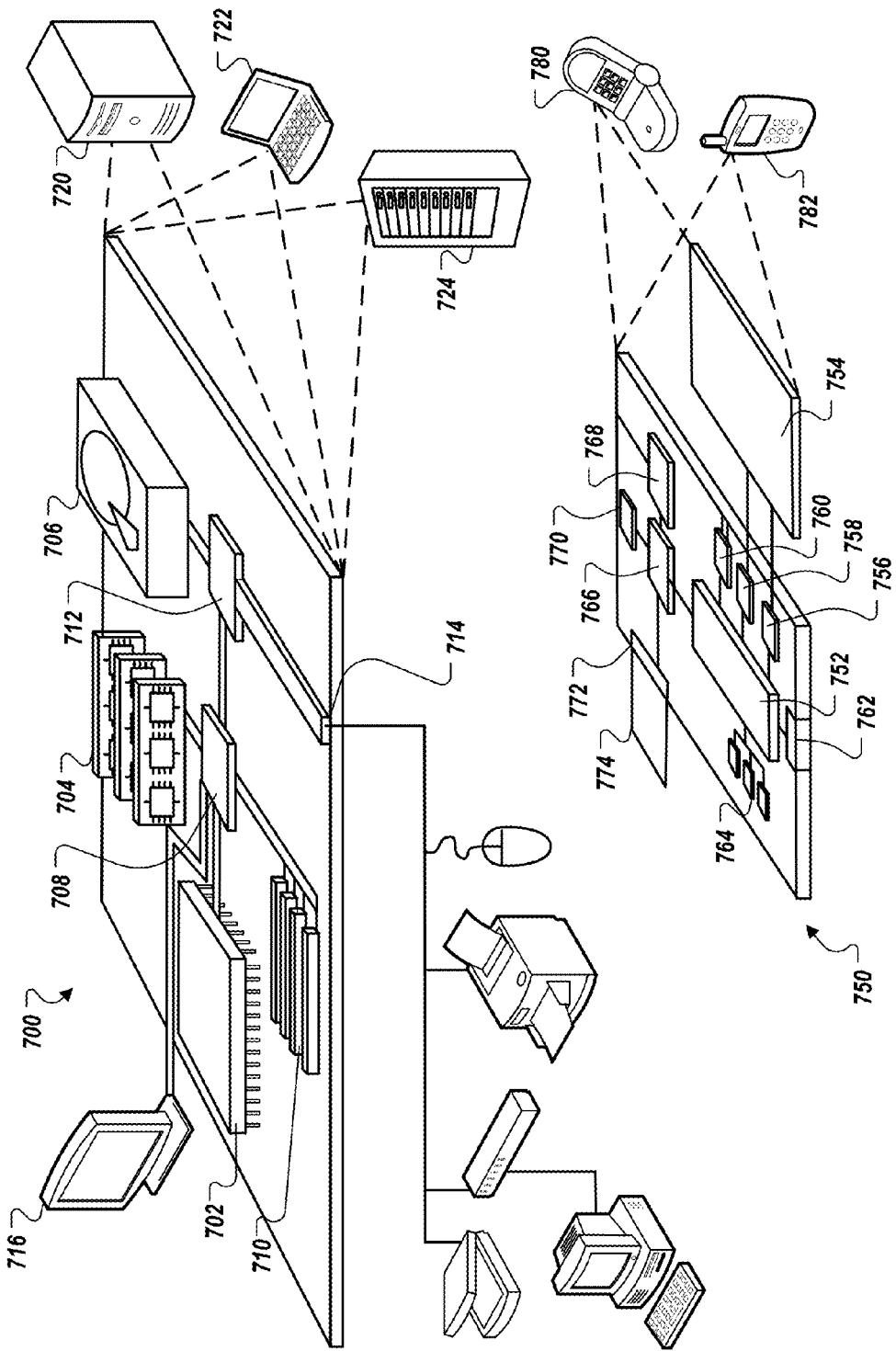
FIG. 7 shows examples of computing devices on which the processes described herein, or portions thereof, may be implemented.

FIG. 7 shows examples of computing devices on which the processes described herein, or portions thereof, may be implemented. In this regard, FIG. 7 shows an example of a generic computing device 700 and a generic mobile computing device 750, which may be used to implement the processes described herein, or portions thereof. For example, search system 212 may be implemented on computing device 700. Mobile computing device 750 may represent a client device of FIG. 1. Other client devices of FIG. 1 may also have the architecture of computing device 700.

Computing device 700 is intended to represent various forms of digital computers, examples of which include laptops, desktops, workstations, personal digital assistants, servers, blade servers, mainframes, and other appropriate computers. Computing device 750 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Components 702, 704, 706, 708, 710, and 712, are interconnected using various busses, and may be mounted on a common motherboard or in other manners as appropriate. The processor 702 may process instructions for execution within the computing device 700, including instructions stored in the memory 704 or on the storage device 706 to display graphical information for a GUI on an external input/output device, for example, display 716 coupled to high speed interface 708. In other implementations, multiple processors and/or multiple buses may be used, as appropriate, along with multiple memories and types of memory. Also, multiple computing devices 700 may be connected, with a device providing a portion of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, examples of which include a magnetic or optical disk.

The storage device 706 is capable of providing mass storage for the computing device 700. In one implementation, the storage device 706 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, including those described above. The information carrier may be a non-transitory computer- or machine-readable medium, for example, the memory 704, the storage device 706, or memory on processor 702. For example, the information carrier may be a non-transitory, machine-readable storage medium.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer, e.g., a laptop computer 722. Alternatively, components from computing device 700 may be combined with other components in a mobile device (not shown), e.g., device 750. Such devices may contain one or more of computing device 700, 750, and an entire system may be made up of multiple computing devices 700, 750 communicating with one other.

Computing device 750 includes a processor 752, memory 764, an input/output device, e.g. a display 754, a communication interface 766, and a transceiver 768, among other components. The device 750 may also be provided with a storage device, e.g., a microdrive or other device, to provide additional storage. The components 750, 752, 764, 754, 766, and 768, are interconnected using various buses, and several of the components may be mounted on a common motherboard or in other manners as appropriate.

The processor 752 may execute instructions within the computing device 750, including instructions stored in the memory 764. The processor may be implemented as a chipset of chips that include separate and multiple analog and digital processors. The processor may provide, for example, for coordination of the other components of the device 750, e.g., control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 may be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 764, expansion memory 774, or memory on processor 752.

Device 750 may communicate wirelessly through communication interface 766, which may include digital signal processing circuitry where necessary. Communication interface 766 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, e.g., using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, e.g., through a speaker, e.g., in a handset of device 750. Such sound may include sound from voice telephone calls, may include recorded sound (e.g., voice electronic messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be a form of sensory feedback (e.g., visual feedback, auditory feedback, or tactile feedback); and input from the user may be received in a form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or a combination of such back end, middleware, or front end components. The components of the system may be interconnected by a form or medium of digital data communication (e.g., a communication network). Examples of communication networks include a local area network ("LAN"), a wide area network ("WAN"), and the Internet.

The computing system may include clients and servers. A client and server are generally remote from one other and typically interact through a communication network. The relationship of client and server arises by virtue of computer programs running on the respective computers and having a client-server relationship to one other.

In some implementations, the engines described herein may be separated, combined or incorporated into a single or combined engine. The engines depicted in the figures are not intended to limit the systems described here to the software architectures shown in the figures.

For situations in which the systems and techniques discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information may be determined for the user, or a user's geographic location may be generalized where location information is obtained (e.g., to a city, zip code, or state level), so that a particular location of the user cannot be determined.

Elements of different implementations described herein may be combined to form other implementations not specifically set forth above. Elements may be left out of the processes, computer programs, Web pages, etc., described herein without adversely affecting their operation. In addition, the logic flows depicted in the figures do not require the particular order shown, or sequential order, to achieve desirable results. Various separate elements may be combined into one or more individual elements to perform the functions described herein.

The features described herein may be combined in a single system, or used separately in one or more systems.

Other implementations not specifically described herein are also within the scope of the following claims.

What is claimed is:

1. A method comprising:
receiving audio;
determining, based at least on comparing a representation of one or more features of the audio to a set of representations of one or more corresponding features of other items of content, a proximity in a vector space of the representation of the one or more features of the audio to each of the representations of one or more corresponding features of other items of content, wherein each of the representations of one or more corresponding features of other items of content is associated with two or more language models that are each associated with a different topic;
determining, based at least on the proximities in the vector space of the representation of the one or more features of the audio to the representations of one or more corresponding features of other items of content, that the representation of the one or more features of the audio is proximate to a representation of one or more corresponding features of another item of content;
identifying (i) the language models that are associated with the representation of the one or more corresponding features of the other item of content that is indicated as proximate to the representation of the one or more features of the audio, and, (ii) for each language model that is associated with the representation of the one or more corresponding features of the other item of content, a relevance of the topic associated with the language model to the other item of content;
obtaining, for each of the language models that are associated with the representation of the one or more corresponding features of the other item of content that is indicated as proximate to the representation of the one or more features of the audio, (i) a transcription of the audio, and (ii) a speech recognizer confidence score;
generating, for each transcription, an aggregated score based at least on (i) the speech recognizer confidence score for the transcription, (ii) the relevance of the topic associated with the language model for which the transcription was obtained to the other item of content, and (iii) the proximity of the representation of the one or more features of the audio to the representation of the one or more corresponding features of the other item of content; and
selecting a particular transcription of the audio, from among the transcriptions, based at least on the aggregated scores.

2. The method of claim 1, further comprising:
classifying documents by topic;
classifying other audio by topic based on transcriptions of the other audio; and
using the documents and the transcriptions of the other audio as training data to train at least the language models that are each associated with a different topic.

3. The method of claim 1, wherein determining that the representation of the one or more features of the audio is proximate to the representation of the one or more corresponding features of the other item of content comprises:
mapping the representation of the one or more features of the audio into the vector space; and
identifying the representation of the one or more features of the audio as proximate to the representation of the one or more corresponding features of the other item of content based at least on a distance between the representation of the one or more features of the audio and the representation of the one or more corresponding features of the other item of content in the vector space.

4. The method of claim 3, wherein identifying the representation of the one or more features of the audio as proximate to the representation of the one or more corresponding features of the other item of content based at least on the distance between the representation of the one or more features of the audio and the representation of the one or more corresponding features of the other item of content in the vector space comprises:
determining that the representation of the one or more features of the audio is within a range of the representation of the one or more corresponding features of the other item of content.

5. The method of claim 3, wherein identifying the representation of the one or more features of the audio as proximate to the representation of the one or more corresponding features of the other item of content based at least on the distance between the representation of the one or more features of the audio and the representation of the one or more corresponding features of the other item of content in the vector space comprises:
determining that the distance is one of a predetermined number of closest distances between the representation of the one or more features of the audio and representations of one or more corresponding features of other items of content, wherein the representations of one or more corresponding features of other items of content include the representation of the one or more corresponding features of the other item of content.

6. The method of claim 3, wherein the vector space is an n-dimensional topic space, and wherein the representation of the one or more features of the audio is an n-dimensional vector.

7. The method of claim 6, wherein each of the dimensions of the n-dimensional topic space corresponds to a topic.

8. The method of claim 1, comprising identifying one or more topics associated with the audio.

9. The method of claim 8, wherein the one or more topics associated with the audio are identified based on metadata associated with the audio.

10. The method of claim 8, wherein the one or more topics associated with the audio are identified based on a transcription of the audio that is generated using a general language model that is not topic-specific.

11. The method of claim 1, wherein the representation of the one or more features of the audio comprises a vector representation of the one or more features of the audio, and wherein the representation of the one or more corresponding features of the other content comprises a vector representation of the one or more corresponding features of the other content.

12. The method of claim 1, wherein the other item of content is audio content or written language content.

13. The method of claim 1, wherein the topics that are each associated with a different language model are part of a topic hierarchy, at least one of the topics associated with a language model being at a higher level in the topic hierarchy than another one of the topics associated with a language model.

14. The method of claim 1, wherein the representation of the one or more features of the audio comprises a vector representation of the one or more features of the audio in which the elements of the vector representation of the one or more features of the audio each indicate a relevance of the audio to a different topic, and wherein the representation of the one or more corresponding features of the other content comprises a vector representation of the one or more corresponding features of the other content in which the elements of the vector representation of the one or more corresponding features of the other content each indicate a relevance of the other item of content to a different topic.

15. One or more non-transitory machine-readable media storing instructions that are executable by one or more processing devices to perform operations comprising:
  receiving audio;
  determining, based at least on comparing a representation of one or more features of the audio to a set of representations of one or more corresponding features of other items of content, a proximity in a vector space of the representation of the one or more features of the audio to each of the representations of one or more corresponding features of other items of content, wherein each of the representations of one or more corresponding features of other items of content is associated with two or more language models that are each associated with a different topic;
  determining, based at least on the proximities in the vector space of the representation of the one or more features of the audio to the representations of one or more corresponding features of other items of content, that the representation of the one or more features of the audio is proximate to a representation of one or more corresponding features of another item of content;
  identifying (i) the language models that are associated with the representation of the one or more corresponding features of the other item of content that is indicated as proximate to the representation of the one or more features of the audio, and, (ii) for each language model that is associated with the representation of the one or more corresponding features of the other item of content, a relevance of the topic associated with the language model to the other item of content;
  obtaining, for each of the language models that are associated with the representation of the one or more corresponding features of the other item of content that is indicated as proximate to the representation of the one or more features of the audio, (i) a transcription of the audio, and (ii) a speech recognizer confidence score;
  generating, for each transcription, an aggregated score based at least on (i) the speech recognizer confidence score for the transcription, (ii) the relevance of the topic associated with the language model for which the transcription was obtained to the other item of content, and (iii) the proximity of the representation of the one or more features of the audio to the representation of the one or more corresponding features of the other item of content; and
  selecting a particular transcription of the audio, from among the transcriptions, based at least on the aggregated scores.

16. The non-transitory machine-readable media of claim 15, wherein determining that the representation of the one or more features of the audio is proximate to the representation of the one or more corresponding features of the other item of content comprises:
  mapping the representation of the one or more features of the audio into the vector space; and
  identifying the representation of the one or more features of the audio as proximate to the representation of the one or more corresponding features of the other item of content based at least on a distance between the representation of the one or more features of the audio and the representation of the one or more corresponding features of the other item of content in the vector space.

17. The non-transitory machine-readable media of claim 15, wherein the operations comprise identifying one or more topics associated with the audio.

18. A system comprising:
  memory storing instructions that are executable; and
  one or more processing devices to execute the instructions to perform operations comprising:
    receiving audio;
    determining, based at least on comparing a representation of one or more features of the audio to a set of representations of one or more corresponding features of other items of content, a proximity in a vector space of the representation of the one or more features of the audio to each of the representations of one or more corresponding features of other items of content, wherein each of the representations of one or more corresponding features of other items of content is associated with two or more language models that are each associated with a different topic;
    determining, based at least on the proximities in the vector space of the representation of the one or more features of the audio to the representations of one or more corresponding features of other items of content, that the representation of the one or more features of the audio is proximate to a representation of one or more corresponding features of another item of content;
    identifying (i) the language models that are associated with the representation of the one or more corresponding features of the other item of content that is indicated as proximate to the representation of the one or more features of the audio, and, (ii) for each language model that is associated with the representation of the one or more corresponding features of the other item of content, a relevance of the topic associated with the language model to the other item of content;

obtaining, for each of the language models that are associated with the representation of the one or more corresponding features of the other item of content that is indicated as proximate to the representation of the one or more features of the audio, (i) a transcription of the audio, and (ii) a speech recognizer confidence score;

generating, for each transcription, an aggregated score based at least on (i) the speech recognizer confidence score for the transcription, (ii) the relevance of the topic associated with the language model for which the transcription was obtained to the other item of content, and (iii) the proximity of the representation of the one or more features of the audio to the representation of the one or more corresponding features of the other item of content; and selecting a particular transcription of the audio, from among the transcriptions, based at least on the aggregated scores.

19. The system of claim 18, wherein determining that the representation of the one or more features of the audio is proximate to the representation of the one or more corresponding features of the other item of content comprises:

mapping the representation of the one or more features of the audio into the vector space; and identifying the representation of the one or more features of the audio as proximate to the representation of the one or more corresponding features of the other item of content based at least on a distance between the representation of the one or more features of the audio and the representation of the one or more corresponding features of the other item of content in the vector space.

* * * * *